United States Patent
Curtis

(10) Patent No.: US 11,625,215 B2
(45) Date of Patent: Apr. 11, 2023

(54) AUDIO CANCELLATION AND CONTENT RECOGNITION OF AUDIO RECEIVED OVER HDMI/ARC

(71) Applicant: Roku, Inc., San Jose, CA (US)

(72) Inventor: Robert Caston Curtis, Los Gatos, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/830,869

(22) Filed: Jun. 2, 2022

(65) Prior Publication Data

US 2022/0291894 A1    Sep. 15, 2022

Related U.S. Application Data

(60) Continuation of application No. 17/109,698, filed on Dec. 2, 2020, now Pat. No. 11,392,342, which is a
(Continued)

(51) Int. Cl.
*G06F 3/16*     (2006.01)
*G10L 19/008*   (2013.01)
(Continued)

(52) U.S. Cl.
CPC ............ *G06F 3/162* (2013.01); *G06F 16/635* (2019.01); *G10L 15/22* (2013.01); *G10L 19/008* (2013.01);
(Continued)

(58) Field of Classification Search
CPC ....................................................... G06F 3/16
See application file for complete search history.

(56) References Cited

U.S. PATENT DOCUMENTS

| 8,997,132 B1 | 3/2015 | Rowe |
| 9,324,322 B1 | 4/2016 | Torok et al. |

(Continued)

FOREIGN PATENT DOCUMENTS

| CN | 107371059 A | 11/2017 |
| CN | 107371060 A | 11/2017 |
| KR | 2017-0093508 A | 8/2017 |

OTHER PUBLICATIONS

International Search Report and Written Opinion of the International Searching Authority directed to related International Patent Application No. PCT/US2019/051250, dated Jan. 17, 2020; 9 pages.
(Continued)

*Primary Examiner* — Olisa Anwah
(74) *Attorney, Agent, or Firm* — Sterne, Kessler, Goldstein & Fox P.L.L.C.

(57) ABSTRACT

Apparatus, systems, and methods are disclosed for cancellation and content recognition of audio received over a High-Definition Multimedia Interface (HDMI)/Audio Return Channel (ARC) port of a display device. The media device receives audio over the HDMI/ARC port from the display device, processes the audio by identifying, decoding, re-encoding, and fingerprinting the audio with identification information, and subsequently streams the audio within the media streaming environment, including to external speakers, such as voice-enabled speakers. Based on the identification information and recognized content of the processed audio, the media device offers additional content for streaming to a user. The media device continuously monitors for spoken voice received over a voice-enabled speaker while the media device simultaneously receives, processes, and streams audio from the display device. By cancelling the part of the streaming audio received simultaneously with the
(Continued)

spoken voice received, the media device enables the voice-enabled speaker to distinguish a voice command.

20 Claims, 5 Drawing Sheets

Related U.S. Application Data division of application No. 16/133,797, filed on Sep. 18, 2018, now Pat. No. 10,871,935.

(51) Int. Cl.
  *G10L 25/78* (2013.01)
  *H04R 3/12* (2006.01)
  *G10L 15/22* (2006.01)
  *G06F 16/635* (2019.01)

(52) U.S. Cl.
  CPC .............. *G10L 25/78* (2013.01); *H04R 3/12* (2013.01); *G10L 2015/223* (2013.01)

(56) References Cited

U.S. PATENT DOCUMENTS

| | | | |
|---|---|---|---|
| 9,729,928 B2 | 8/2017 | Kim et al. | |
| 9,749,552 B2 | 8/2017 | Gopinath et al. | |
| 10,296,284 B2 | 5/2019 | Kim et al. | |
| 10,812,751 B2 | 10/2020 | Stern et al. | |
| 10,841,651 B1 * | 11/2020 | Karnezos | H04L 67/02 |
| 10,871,935 B2 | 12/2020 | Curtis | |
| 2007/0274297 A1 | 11/2007 | Cross et al. | |
| 2009/0125961 A1 | 5/2009 | Perlman et al. | |
| 2009/0299752 A1 | 12/2009 | Rodriguez et al. | |
| 2010/0186041 A1 | 7/2010 | Chu et al. | |
| 2011/0103609 A1 | 5/2011 | Pelland et al. | |
| 2011/0142245 A1 | 6/2011 | Toba et al. | |
| 2012/0311173 A1 | 12/2012 | Agarwal et al. | |
| 2013/0035086 A1 | 2/2013 | Chardon et al. | |
| 2013/0322348 A1 | 12/2013 | Julian et al. | |
| 2014/0122059 A1 | 5/2014 | Patel et al. | |
| 2015/0195603 A1 | 7/2015 | McDevitt | |
| 2016/0021430 A1 | 1/2016 | Labosco et al. | |
| 2016/0050457 A1 | 2/2016 | Mondal et al. | |
| 2016/0057490 A1 | 2/2016 | Besehanic | |
| 2016/0142849 A1 | 5/2016 | Satheesh et al. | |
| 2016/0253710 A1 | 9/2016 | Publicover et al. | |
| 2016/0286313 A1 | 9/2016 | Kofman et al. | |
| 2017/0070789 A1 | 3/2017 | Liassides et al. | |
| 2018/0115733 A1 | 4/2018 | Fischer et al. | |
| 2018/0115792 A1 | 4/2018 | Jhaveri | |
| 2018/0122378 A1 | 5/2018 | Mixter et al. | |
| 2018/0262855 A1 | 9/2018 | Guldener et al. | |
| 2018/0277112 A1 | 9/2018 | Kim et al. | |
| 2018/0278999 A1 | 9/2018 | David et al. | |
| 2019/0069043 A1 | 2/2019 | Ng et al. | |
| 2019/0373313 A1 | 12/2019 | Jackson et al. | |
| 2020/0089464 A1 | 3/2020 | Curtis | |
| 2020/0092515 A1 | 3/2020 | Stern et al. | |
| 2020/0097500 A1 | 3/2020 | Breaux | |
| 2020/0221181 A1 | 7/2020 | Gupta et al. | |
| 2021/0089258 A1 | 3/2021 | Curtis | |

OTHER PUBLICATIONS

International Search Report and Written Opinion of the International Searching Authority directed to related International Patent Application No. PCT/US2019/051252, dated Jan. 31, 2020; 12 pages.

Extended Search Report directed to related European Patent Application No. 19861469.5, dated Apr. 25, 2022; 10 pages.

* cited by examiner

AUDIO CANCELLATION AND CONTENT RECOGNITION OF AUDIO RECEIVED OVER HDMI/ARC

CROSS-REFERENCE TO RELATED APPLICATIONS

This application is a continuation of U.S. patent application Ser. No. 17/109,698, filed Dec. 2, 2020, now allowed, which is a divisional of U.S. patent application Ser. No. 16/133,797, now U.S. Pat. No. 10,871,935, which is related to U.S. patent application Ser. No. 16/133,802, titled "Dynamically Switching To/From a First Network During Audio Playback Over HDMI/ARC," filed Sep. 18, 2018, now U.S. Pat. No. 10,812,751; U.S. patent application Ser. No. 16/133,811, titled "Audio Synchronization of a Dumb Speaker and a Smart Speaker Using a Spread Code," filed Sep. 18, 2018, now U.S. Pat. No. 10,958,301; U.S. patent application Ser. No. 16/133,813, titled "Wireless Audio Synchronization Using a Spread Code," filed Sep. 18, 2018, now U.S. Pat. No. 10,931,909; and U.S. patent application Ser. No. 16/133,817, titled "Identifying Audio Characteristics of a Room Using a Spread Code," filed Sep. 18, 2018, now U.S. Pat. No. 10,992,336, all of which are herein incorporated by reference in their entireties.

TECHNICAL FIELD

This disclosure generally relates to applications using audio received via an HDMI/ARC interface on a display device.

BACKGROUND

Ever since the High-Definition Multimedia Interface (HDMI) 1.4 standard was introduced in 2009, Audio Return Channel (ARC) has been available on TVs, soundbars, receivers, and other electronic devices.

The HDMI/ARC protocol enables two-way communication between devices over a single HDMI connection. In particular, the HDMI/ARC port allows HDMI to be used as both an input and an output for audio.

The potential for HDMI/ARC is vast. To date, however, HDMI/ARC ports have been used primarily to reduce cabling in home entertainment systems. Thus, conventional electronic devices have not yet taken advantage of the full functionality and capabilities of HDMI/ARC.

BRIEF SUMMARY

Apparatus, system, article of manufacture, method, and/or computer product embodiments, and/or combinations and sub-combinations thereof, are described to configure a media device to accept and process the audio output from an HDMI/ARC port of a display device. In some embodiments, a media device can receive an audio stream over HDMI/ARC and transmit the audio stream to wireless speakers for broadcast. The media device can identify an audio stream, decode it into multi-channel audio, re-encode it into a format that can be streamed into the speakers, and then play it back over the speakers.

In some embodiments, the media device is configured to cancel the audio that is received over HDMI/ARC and subsequently transmitted to a voice-enabled speaker when voice is simultaneously received by the voice-enabled speaker. While receiving audio from a display device, processing the audio, and streaming the audio to the voice-enabled speaker, the media device continuously monitors for voice received over the voice-enabled speaker. By cancelling the part of the streaming audio received simultaneously with the voice received, and leaving only the voice, the media device enables the voice-enabled speaker to distinguish the voice and act on a received voice command. In some embodiments, audio streaming can then continue from the point in the stream at which the stream was cancelled.

In other embodiments, the media device, which is communicatively coupled to an HDMI/ARC interface of a display device, receives audio over the HDMI/ARC interface from the display device, and processes the audio by identifying, decoding, re-encoding, and fingerprinting the audio with identification information, for subsequent streaming within the media streaming environment. With the identification information, the media device can offer additional content for streaming to the user based on the recognized content of the processed audio.

This Summary is provided for purposes of illustrating example embodiments, which should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1:
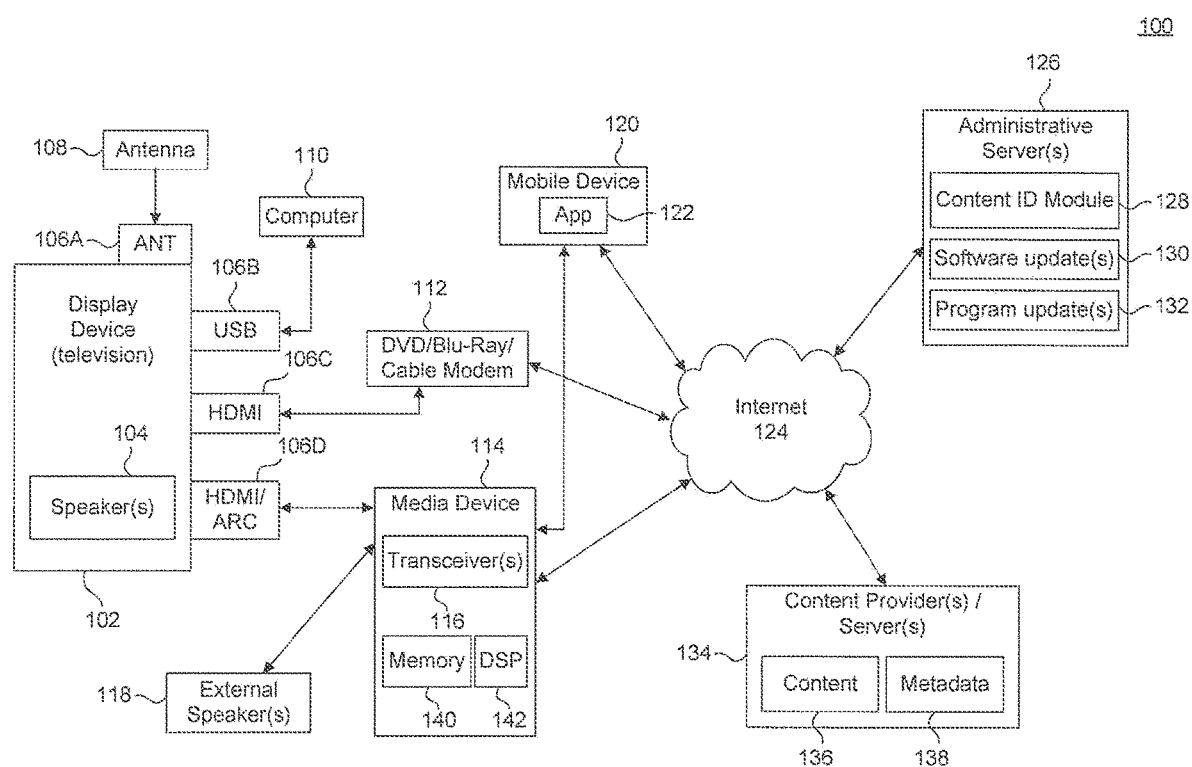
FIG. 1 illustrates a block diagram of a media streaming environment that includes a display device with High-Definition Multimedia Interface (HDMI)/Audio Return Channel (ARC) capability, according to some embodiments.

"Audio Return Channel (ARC)" refers to a feature of the HDMI interface built into many TVs, receivers, and sound bars/speakers, to name just some examples. ARC uses a single HDMI connection to output audio from a TV to a sound bar, speakers, or audio/video (AV) receiver, for example. From video that is sent to the TV over the HDMI interface, the same HDMI interface sends the associated audio from the TV back over the HDMI interface. In doing so, the audio of the TV content may be sent to a receiver/sound bar/speaker for higher quality audio broadcast than may be achieved over the TV's internal speakers, and no separate audio cable is required. To use HDMI/ARC, TVs/display devices, receivers, sound bars, and media devices, for example, must be ARC-compatible.

When the term "ARC" is used alone in this specification, it should be assumed to be equivalent to the term "HDMI/ARC." When referring to ARC or HDMI/ARC, the words "connector," "connection," "interface," or "port" may be used interchangeably within the specification. The terms generally mean a link or an electronic coupling for means of communication or transport. In various embodiments, two or more devices may be integrated with, operatively coupled to, and/or connected to each other over HDMI/ARC. A person of ordinary skill in the art will understand the context of the disclosure to further define whether a link between two or more devices is communicative in software and/or physical in hardware.

In some embodiments, an HDMI connection out of a TV configured for the ARC protocol is connected to an HDMI/ARC interface (port) of a streaming box, such as a media device. Any content, from, for example, a digital over-the-air source such as an ATSC (Advanced Television Systems Committee) receiver (tuned to a national broadcast channel such as NBC or a local TV station), Xbox, cable, satellite, Wi-Fi, and/or wired Internet, that is playing through the TV can be streamed in this manner. The connection through the HDMI/ARC interface can create a wireless bridge to any ARC-compatible speaker around the home, for example.

Speakers may be "smart speakers," for example. A smart speaker is a wireless speaker that receives audio signals over-the-air using radio frequencies (RF), such as over Wi-Fi, rather than over audio wires or cables. The wireless speaker includes an RF receiver and an RF transmitter. Speakers may also be voice-enabled. "Voice-enabled smart speaker" or "voice-enabled external speaker" refers to a wireless speaker that can be coupled to a voice command device with integrated voice-recognition software. The software can process spoken requests by a user to perform a task or service, allowing the user to vocally interact with the speaker and activate functionality hands-free. The voice-enabled smart speaker subsequently acts on the user's voice commands.

Transmitting audio can be done in several different ways. In some embodiments, a media device receives audio from a service such as Netflix or Hulu, for example, over the Internet (not using HDMI/ARC), from which the audio can be directly sent, or streamed, from the media device to speakers (whether smart speakers or other types of speakers). In other embodiments, the media device receives audio data bits over the HDMI/ARC cable. When the audio is received, it can be decoded by a receiver, and played immediately by a media device, rather than being saved to internal buffers, for example. When streaming, a user does not have to wait to download the complete audio content to play it. Because the media is transmitted in a continuous stream of data, it can play as it arrives.

A person of ordinary skill in the art will appreciate that it is possible to accomplish different audio processing based on what is playing on the TV. Although any content coming from the media device is already known to the media device, content coming from the TV from another source could go through a content recognition process at the media device, and/or process different audio depending on the source of the audio signal, such as a connection to over-the-air versus cable content, or when streaming various channels, for example.

The audio content can be modified into a format that is suitable for transmitting over the local Wi-Fi network, or "home network," with particular algorithms to minimize latency (delay) when transmitting the audio to the speakers, particularly during times of interference on the network or shared usage of the network with other services or devices. In some embodiments, latency can be significantly reduced by connecting speakers directly to the media device. For example, a soundbar wireless speaker system can connect dedicated speakers to an audio source in a point-to-point fashion. Comparatively, the media device can provide flexibility to create an ecosystem of devices (for example, in a multi-spoke fashion) on a Wi-Fi network that can listen in to a particular audio stream. However, this flexibility may introduce more complexity; for example, each speaker in the network may receive audio at a different latency.

In some embodiments, a media device may use a protocol standard with reference (industry-standard) architecture and software that allows other device manufacturers to connect within the same ecosystem or become source devices for an audio broadcast. For example, a smartphone enabled to run on the protocol standard may transmit audio via Bluetooth to a Bluetooth-enabled speaker, which in turn may transmit on the home network to other speakers within the home that are connected to the home network. The method of streaming from the smartphone to its dedicated speakers may be determined by the application being used on the smartphone to stream the audio, such as a Spotify app streaming over the Internet using Spotify Connect. Once the media device streams audio to speakers, the speakers themselves on the home network use Wi-Fi protocol to communicate, however. A media device connected to the HDMI/ARC output on a TV would stream everything coming from that TV over the HDMI/ARC connection, such as the TV streaming Netflix, receiving content from a Blu-ray player, or receiving a local broadcast over ATSC, for example.

Other embodiments use the HDMI/ARC protocol and hardware interface for audio cancellation during voice recognition by smart speaker devices. "Voice recognition" refers to technology (hardware or software, for example) that enables a device or computer program to receive and interpret dictation or to understand and execute oral (spoken) commands. Voice-enabled or voice-activated devices, such as voice-enabled speakers, use various voice recognition systems and algorithms that strive to recognize a user's voice commands when the user is far, up to five (5) meters away, for example, from the device's microphone(s). This is known as "far-field voice."

For example, when a smart speaker is playing music, the smart speaker, according to the smart speaker's voice-recognition technology, can still understand a person's speaking voice when the cancellation technique is used. Because the Echo Cancellation algorithm knows the audio that is output from the smart speaker, the known audio can be subtracted from the total input that includes what is coming over the smart speaker's microphones. To the smart speaker listening for a voice, it sounds as though the room is quiet.

Comparatively, a media device on its own can only cancel the audio that it knows that it is generating, such as streamed Netflix content. Without the HDMI/ARC interface, the media device would not know what to cancel from what the TV is playing on its own, such as Blu-ray or over-the-air ATSC content. However, the HDMI/ARC interface allows the application of the cancellation algorithm to everything that the TV is generating. For a media device capable of far-field voice recognition for controlling the device, the HDMI/ARC interface can be used to cancel the streamed content when a user's voice is applied to control the media device. Thus, effective voice recognition can be achievable regardless of what the user is streaming from the TV or its source.

Furthermore, because the media device connected to the HDMI/ARC interface can distinguish various other sound sources coming into the device, the sound sources can be cancelled (subtracted out) when voice is coming into any voice-enabled device connected to the media-streaming ecosystem. The media device can output the voice to the connected voice-enabled device, without the other sound sources or audio that are/is streaming into the media device, so that the voice-enabled device can better recognize voice commands. This can also prevent voice from inadvertently waking up a voice-enabled device, for example, if the voice was not intended to control the voice-enabled device.

In some embodiments, any streaming audio that was cancelled can be buffered and thus resume from the point at which it was interrupted or cancelled. In other embodiments, any cancelled audio may be lost, and the audio can be resumed at a time in the stream corresponding to the elapsed time of the audio cancellation.

In some embodiments, a streaming TV can allow for automatic video content recognition of anything that a user is watching over the streaming TV. If the user opts in to the feature, for example, the streaming TV can fingerprint the audio and video by using a backend (third-party) service that detects what is being streamed based on the fingerprints.

"Fingerprinting" of streaming audio refers to creating a condensed digital summary of an audio signal, from as little as two seconds of audio, for example, that can be used to identify an audio sample, such as a song, melody, or advertisement, or quickly locate similar items in an audio database. Fingerprinting may also assist in "audio content recognition," or the identification of video or other media content, for example, based on the associated audio, while streaming. For example, fingerprinting may allow a media provider to determine what TV program a user is watching so as to be able to offer similar content to the user by way of suggested programming or other advertisement, for example. Audio fingerprinting uses a software algorithm to process attributes such as frequency, intensity, and relative time of audio signal points, and creates a map, or plot, of the attributes. The plot, in the form of a spectrogram of peaks and valleys, for example, then serves as the audio's unique fingerprint to be matched against other spectrograms in a database.

Even if a streaming TV is not being used, a media device using the HDMI/ARC feature as disclosed herein can monitor the audio in the same way. This capability can aid in choosing advertisements for the user or making content recommendations to the user. For example, if the media device recognizes that the user is watching a particular series, the media device could make a recommendation to the user to watch a particular series from a streaming service, for example, Hulu, that is similar to the one the user is already watching, or the same series on the streaming service to allow the user to watch the series from the beginning at the user's convenience.

In some embodiments, a media device has one single-channel transceiver (or radio) and thus cannot communicate over more than one RF channel (or frequency) at a time. However, a media device with only one transceiver can communicate on multiple networks at the same time as long as the networks are on the same channel at the same time. In other embodiments, a media device may have two or more transceivers, allowing the media device to communicate over more than one channel simultaneously. Different transceiver configurations may have different implications depending on whether the media device is streaming media content over the Internet or over the HDMI/ARC port. A person of ordinary skill in the art will appreciate that the examples that follow describe only a small portion of the possible scenarios.

When a media device with one transceiver is streaming from the Internet, latency issues, for example on a 2G network on which the transmission space can be densely populated and very congested, can cause throughput of data to suffer. However, many devices to which the disclosed embodiments can be coupled may use 5G networks, which can facilitate greater throughput. However, if a user only has a 2G router, for example, the router would control the overall speed of the network. In this case, to prevent latency problems while streaming, the media device can delay a content stream, on the order of 300 milliseconds, for example, to redistribute audio. Introducing such a delay can prevent any detectable degradation of the stream due to the latency. The media device can then buffer the content to all speakers on the network.

If the media device with one transceiver is not streaming from the Internet and is instead receiving over the HDMI/ARC interface, sending various audio sources out to all connected speakers may require achieving a clean Wi-Fi channel to allow uninterrupted digital communication of sufficient signal quality. This may be because, for example, it is more difficult to keep the audio in sync with the video when a user's home network is slow and connected speakers are spaced from the media device at varying distances. In this case, an embodiment can include an additional transceiver in the media device so that the transmission does not necessarily have to be on a user's potentially slow network. For example, when not streaming from the Internet, the media device's second transceiver can use a separate 5G network and avoid the user's 2G router.

If a media device has only one transceiver, another solution is fast switching between networks on different channels. It is possible to switch the media device and all devices connected to that device (for example, speakers) very quickly from the user's home network to a cleaner, faster, low-latency channel that uses 5G, for example. The media device can disconnect from the user's home network and create an ad hoc network for the purposes of streaming content from the media device cleanly and seamlessly to the user over smart speakers, for example. This process can create a new digital connection, for example, a "softAP" (or software-enabled access point), on the media device. This process allows the media device to become an access point and create its own network with one or more other connected devices, such as external speaker(s).

If the ad hoc network is created on the same channel as the home network, it is possible for the media device to communicate at the same time on multiple networks, such as the home network and one or more softAPs or ad hoc networks, with other connected devices. However, fast switching between networks on different channels is advantageous when a current network is overloaded, or experiencing high latency and/or low available bandwidth, for example. It may be preferable that no content is being streamed at the time of switching, so as not to interrupt the user's viewing/listening experience, for example. In such a case, the switching can be done during an absence of the audio stream from the display device. But fast switching is also possible during streaming and can be tolerable to the user depending on content being streamed, for example, during advertisements or music audio.

Additionally, fast switching is supported by standard media streaming protocols such as High-bandwidth Digital Content Protection (HDCP). HDCP is the copy and content protection standard used by the TV and film industry to prevent copying of digital audio and video content as it travels across connections. HDCP is used on HDMI connections for digital devices like Blu-ray players, cable boxes, and streaming devices, such as some embodiments of the media device disclosed herein.

If the media device with one transceiver needs to connect to the Internet only periodically, the media device can switch quickly (for example, on the order of a few milliseconds) between the separate clean channel and the home network to transmit/receive necessary information (for example, for mandatory administrative activities) to/from the servers of the media device. For example, this switching can be done to determine whether a new software update is required to be downloaded, or to determine whether the user has made another choice of content on a mobile app connected to the media device.

This switching may occur for other reasons or "switching conditions." For example, a user switching the TV away from the input of the media device and back again may cause the connection to the media device to reset to the user's home network. Additionally, a user may be provided the capability to set configurations for communication on the network, including any switching protocols and speaker configurations. A person of ordinary skill in the art will appreciate the capability of the hardware and software of the media device to be adapted to these situations.

The media device may be configured, in various cases of automatic or user-controlled switching, to communicate an indication of the network switching to the user. For example, the media device may integrate an audible indicator into the audio stream to play over connected speakers when the media device switches to a different network. Additionally or alternatively, the media device may display a visual indicator as an external interface, for example, as one or more LED indicator(s) on a set-top box. The media device may also integrate a visual message to the user into the information stream to the display device for display on a screen, for example. A separate media device management message can alternatively be provided for this purpose. A person of ordinary skill in the art will appreciate the capability of the hardware and software of the media device to be adapted for various embodiments that support these situations also.

For a media device configured with one transceiver, a fast-switching process may not be advantageous if the media device often needs to communicate over the Internet (for example, to its server(s)) or over the user's local network, or if there is a need for uninterrupted streaming for an extended length of time, such as during the streaming of a four-hour documentary film. In such a case, it may be preferred that the media device be configured to have a second transceiver inside the media device, allowing for a separate, simultaneous digital connection to be made on a separate channel/frequency. In some embodiments, the media device and speaker(s) on the home network, for example (a first wireless network), can simultaneously communicate on a separate clean channel (a second wireless network) for uninterrupted audio traffic. The media device can alternatively receive a media device management message or a software update from one or more server(s), for example, on the second wireless network while the media device is streaming on the first wireless network.

A person of ordinary skill in the art will appreciate that the media device can receive audio in other ways besides via the HDMI/ARC port, the Internet, and other methods previously discussed herein. For example, the media device may receive audio from an S/PDIF (Sony/Philips Digital Interface Format) input, standardized in IEC 60958 as IEC 60958 type II (IEC 958 before 1998). An S/PDIF input is a type of digital audio interface used in consumer audio equipment to output audio signals over reasonably short distances using a coaxial cable with RCA (Radio Corporation of America, or, generically, phono) connectors or a fiber optic cable with TOSLINK (Toshiba Link, or, generically, optical audio cable) connectors. Analog inputs are also possible.

Some embodiments of the apparatus, systems, articles of manufacture, methods, and/or computer products, and/or combinations and sub-combinations thereof, described herein are further detailed below, in reference to the figures/drawings of this specification.

FIG. 1 illustrates a block diagram of a media streaming environment 100 that can include a display device 102 with High-Definition Multimedia Interface (HDMI)/Audio Return Channel (ARC) capability, according to some embodiments. Display device 102, which can be or include a television, a monitor, a tablet, and/or a projector, for example, can include one or more speaker(s) 104 and the following interfaces:

ANT port 106A, for connection to an external digital antenna 108 for receiving over-the-air broadcasts, for example;

USB port 106B, a universal serial bus port used for connection to a USB TV tuner or antenna, for service access, or for using the TV as another display device by connecting a computer 110, for example;

HDMI port 106C, for connecting an HDMI-compatible DVD/Blu-ray/cable modem 112, as a combination device or as one or more individually-connected devices and/or simultaneously-connected, switched devices, for example; and HDMI/ARC port 106D, for connecting an ARC-compatible media device 114, for example.

The display device 102 is not limited to having the interfaces 106 that are illustrated in FIG. 1, but may have multiples of the illustrated interfaces and/or other interfaces not shown.

In FIG. 1, media device 114 can be a streaming media device, a digital video disk (DVD) device, an audio/video (A/V) playback device, a cable box, and/or a digital video recording (DVR) device, for example. In some embodiments, the media device 114 can be a part of, integrated with, operatively coupled to, and/or connected to display device 102. The media device 114 includes one or more transceiver(s) 116, memory 140, and a digital signal processor (DSP) 142.

When the media device 114 is communicatively coupled to the HDMI/ARC port 106D of the display device 102, the speaker(s) 104 of the display device 102 can be turned off during audio streaming. However, the speaker(s) 104 can remain on during setup and calibration of the media device 114. For such calibration, the media device 114 may use and/or reference a database of different models of non-streaming TVs.

Instead of using the speaker(s) 104 of the display device 102, the media device 114 can be communicatively coupled to one or more external speaker(s) 118 for audio streaming. External speaker(s) 118 can be any number of commercially- or non-commercially-available speakers configured for wireless communication, such as smart speakers or smart soundbars, for example. Wireless connection from the media device 114 to the external speaker(s) 118 can allow the external speaker(s) 118 to be placed at various locations around a home, for example, without the inconvenience of having to route wires through rooms and around walls, for example.

In some embodiments according to FIG. 1, media device 114 can be configured to communicate with Internet 124, for example. In various embodiments, the connection of the media device 114 to the media streaming environment 100 can include, without limitation, wired and/or wireless intranet, extranet, Internet, cellular, Bluetooth and/or any other long-range, local, short-range, ad-hoc, regional, and/or global communications network, as well as any combination thereof. For example, media device 114 can communicate wirelessly via a Wi-Fi network with the Internet 124 using the one or more transceiver(s) 116, or can communicate with the Internet 124 over a wired connection to a home router (not shown) having communicative connection to the Internet 124, for example.

In some embodiments according to FIG. 1, media device 114 can communicate with mobile device 120 using a software application (app) 122 inside the mobile device 120. The mobile device 120 can be a smartphone, a tablet, and/or a laptop computer, for example. The mobile device 120 with app 122 can allow the user to interact with the media device 114. Specifically, the mobile device 120 and app 122 can be configured for remote control of and communication with the media device 114. Communication between the media device 114 and mobile device 120 can be over the same Wi-Fi network that the media device 114 shares with the Internet 124, for example. In other embodiments, remote control of the media device 114 can be by any component, part, apparatus or method for controlling the media device 114 and/or the display device 102, such as a remote controller, a tablet, a laptop computer, a smartphone, on-screen controls, integrated control buttons, or any combination thereof, to name a few examples.

In FIG. 1, one or more content provider(s)/server(s) 134, such as Netflix and Hulu, for example, can be communicatively coupled to the Internet 124 for provision of content 136 to the Internet 124, for example. A content provider/server 134 may store content 136, such as any combination of music, videos, TV programs, movies, multimedia, images, still pictures, text, graphics, gaming applications, advertising, software, and/or any other content or data objects in electronic form, as well as metadata 138.

In some embodiments, metadata 138 can comprise data describing attributes of the content 136. For example, metadata 138 can include associated or ancillary information about the content 136, indicating or related to category (for example, news, analysis and interpretation, long-form documentary, religion, sports, and entertainment), topic (for example, politics, leadership, technology, and events), content type (for example, TV show, movie, advertisement, and music video), genre (for example, action, adventure, animation, biography, comedy, crime, and educational), and other content-specific attributes, such as format, director, writer, producer, production company, composer, artist, release date, language, runtime, cast member, actor, summary, chapter, production, history, year, trailers, alternative versions, related content, applications, and/or any other information pertaining or relating to the content 136. Metadata 138 may also or alternatively include links to any such information pertaining or relating to the content 136. Metadata 138 may also or alternatively include one or more indexes of content 136, such as but not limited to a trick mode index.

A user may use the mobile device 120 and the app 122 to interact with the media device 114 to select content, such as a movie, TV program, game, etc., from the repository of content 136. The media device 114 can then request the user-selected content from the content provider(s)/server(s) 134 over the Internet 124. The content provider(s)/server(s) 134 can transmit the requested content to the media device 114. The media device 114 can transmit the received content to the display device 102 and/or the external speaker(s) 118 for presentation to the user. In streaming embodiments, the media device 114 can transmit the selected content to the display device 102 and/or external speaker(s) 118 in real-time or near real-time as it receives such content from the content provider(s)/server(s) 134. In non-streaming embodiments, for example, when a network is slow or disconnected, the media device 114 can buffer or store the content received from the content provider(s)/server(s) 134 in the media device 114 for later playback on the display device 102 and/or the external speaker(s) 118.

In FIG. 1, one or more administrative server(s) 126 can be communicatively coupled to the Internet 124 for provision of content information from a content ID module 128, one or more software update(s) 130, and/or one or more program update(s) 132, for example, to the Internet 124. The administrative server(s) 126 may push (initiate sending of) such information to the media device 114 over the Internet 124 when, for example, a software update 130 is available to update the configuration of the media device 114. Similarly, the administrative server(s) 126 may push a program update 132 to the media device 114 via the Internet 124 when a media device 114 has loaded or has been streaming an obsolete version of a TV program, for example.

Alternatively, the administrative server(s) 126 may push a notification to the media device 114 (in the form of a media device management message, for example) to alert a user that a new software or program update is ready for download at a later time, which is advantageous if the media device 114 is busy streaming content to the user. Upon receipt of the alert, the media device 114 may stop the streaming of the content or wait for the stream to complete, and then may pull (by request of the media device 114) the software update(s) 130 and/or program update(s) 132 from the administrative server(s) 126. The media device 114 may also wait to pull the software update(s) 130 and/or program update(s) 132 from the administrative server(s) 126 at the user's convenience and discretion, when the user stops the stream of content and/or requests to start the update(s), for example.

The mobile device 120 can be periodically updated by the administrative server(s) 126 with software update(s) 130 to maintain compatible software for communicative connection with the media device 114. Additionally, the app 122 of the mobile device 120 can be periodically updated by the administrative server(s) 126 with program update(s) 132 to provide an accurate view of content 136 for the user to browse and search for content selection(s). The user may choose to get the software update(s) 130 and/or program update(s) 132 when the media device 114 is no longer streaming content because the stream is complete or the user stops the stream, for example. In such a case, the user may request the software update(s) 130 and/or program update(s) 132 using the app 122 of the mobile device 120.

The content ID module 128 of the one or more administrative server(s) 126 can provide a database that allows the media device 114 access to content information of the particular content that the media device 114 is streaming. Depending on the attributes of the content 136 from the metadata 138 that is sent to the media device 114 over the Internet 124, the media device 114 can query the database in the content ID module 128 over the Internet 124 to identify the particular content that is being streamed. When queried, the content ID module 128 can send back to the media device 114 the identification (ID) information of the streamed content.

Knowing the ID of the content, the media device 114 can then offer to the user content that is similar in attributes, such as category, topic, content type, and/or genre, for example. In this way, the media device 114 can provide the user an entertainment experience uninterrupted by the user's need to search for similar TV programs or movies. Additionally, by identifying the particular content through a database lookup, the media device 114 can use this information to make predictions about the user's interests. The media device 114 can then offer advertising that is congruent to the user's interests, such as concerns retail shopping, event patronage, movie-going, and/or dining, for example.

Audio Cancellation of Audio Received Over HDMI/ARC

Figure 2:
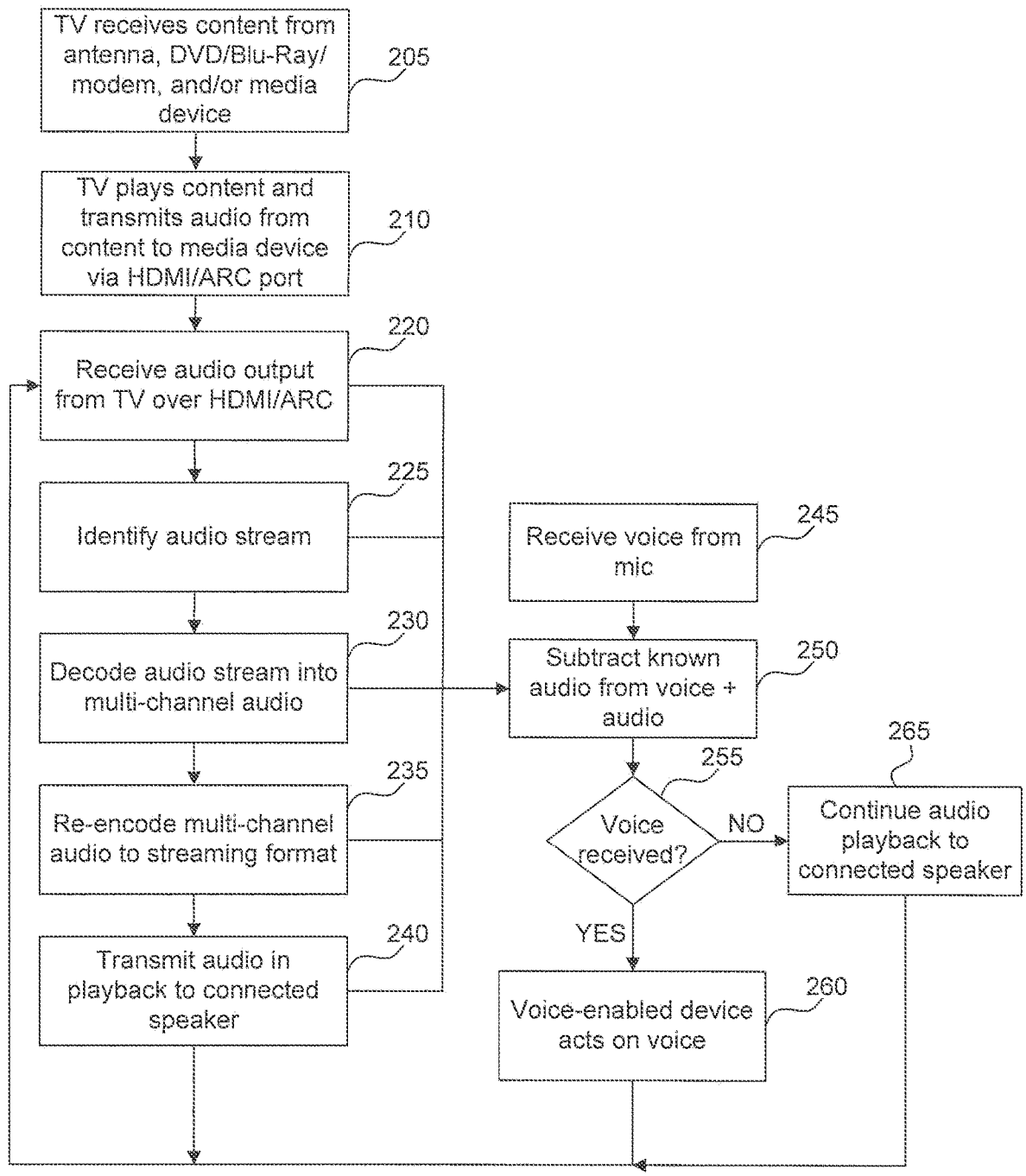
FIG. 2 illustrates a flow chart depicting a method of audio cancellation for audio received over HDMI/ARC, according to some embodiments.

FIG. 2 illustrates a flow chart depicting a method 200 of audio cancellation for audio received over HDMI/ARC, according to some embodiments. FIG. 2 is described in reference to the media streaming environment 100 of FIG. 1. For instance, a TV serves as the display device 102, for example, and is connected to the media device 114 by an HDMI/ARC port 106D on the TV. The media device 114 is also communicatively coupled to external speaker(s) 118, including one or more voice-enabled device(s)/speaker(s), via Wi-Fi, for example.

In step 205, the TV/display device 102 can receive media content from the antenna 108, the DVD/Blu-ray/cable modem 112, and/or the media device 114, for example. In step 210, the TV/display device 102 can play the media content it receives and can transmit the audio from that content to the media device 114 over the HDMI/ARC port 106D. In step 220, the media device 114 can receive an audio stream from the TV/display device 102 over the HDMI/ARC port 106D.

In step 225, the media device 114 can identify the received audio stream using one or more audio processing algorithm(s) that support various types of audio compression formats, or "wrappers," depending on the type of display device 102 to which the media device 114 is connected. The types of audio compression formats can include, but are not limited to: AAC (for example, .MKV, .MP4, and .MOV files); MP3 (for example, .MP3 and .MKV files); WMA (for example, .ASF, .WMA, and .MKV files), FLAC (for example, .FLAC and .MKV files), PCM (for example, .WAV, .MKV, .MP4, and .MOV files), AC3/EAC3 (for example, .MKV, .MP4, .MOV, and .AC3 files), DTS (for example, .MKV, .MP4, .MOV, and .DTS files), ALAC (for example, .MKV, .MP4, .MOV, and .M4A files), and Vorbis (for example, .OGG, .MKV, and .WEBM files), for example.

In step 230, the media device 114 can decode the identified audio stream from the TV/display device 102 into multi-channel audio using an audio codec computer program. "Multi-channel audio" refers to the use of multiple audio tracks to reconstruct audio content on a multi-speaker sound system, for example, a surround sound system. With multi-channel audio, multiple discrete audio channels can be routed to an array of speakers, for example, to enhance the quality and effects of sound in a physical space, such as in a home. The audio channels may transmit streaming audio, for example.

In generating multi-channel audio, the audio codec (not shown) can implement one or more algorithm(s) to decompress the compressed audio format. A multi-channel splitting algorithm can split the audio stream into single physical channels, for example, each carrying an individual track, such as voice and music, that formed the original audio stream from the TV/display device 102.

In step 235, the media device 114 then can re-encode the multi-channel audio to a streaming format compatible with communicatively-coupled external speaker(s) 118. In step 240, once re-encoded, the media device 114 can transmit the audio in playback to the external speaker(s) 118 for broadcast in a room or rooms in which the external speaker(s) 118 are located.

In a room having a voice-enabled device, for example, an external smart speaker with a microphone (mic) configured for voice recognition from an external source, the mic can independently receive voice from a person speaking within or close to the room. The mic may receive far-field voice, for example. In step 245, the media device 114 can receive the voice from the mic that is communicatively coupled to the media device 114.

In the exemplary embodiment of FIG. 2, the voice-enabled device can be the same or a different device as one of the external speaker(s) 118 that is communicatively coupled to the media device 114, for example. Accordingly, if voice-enabled, the external speaker(s) 118 can transmit the voice received to the media device 114.

By splitting, or decoding, the audio tracks into multiple channels in step 230, the media device can decipher and distinguish the known audio tracks from voice received. In step 250, the media device 114 can then subtract, or cancel, the known audio received from the overlaid combination of the audio simultaneously received with the voice received.

In step 255, the media device 114 can thus monitor for, and detect, voice received from the external source during audio playback, and then perform either step 260 or step 265.

In step 260, by isolating the voice received from the external source within or close to the room, the voice-enabled external speaker(s) 118 communicatively coupled to the media device 114 can receive and determine whether the external voice received had been intended as a voice command for the voice-enabled external speaker(s) 118.

In step 260, if the voice received is a recognized command for the voice-enabled external speaker(s) 118, the voice-enabled external speaker(s) 118 can then act on the voice, performing a task as directed by the user or fulfilling a request from the user for information, for example.

Returning to step 255, if voice is not received from an external source, then in step 265, the media device 114 can continue audio playback from the HDMI/ARC port 106D of the TV/display device 102 to the communicatively-coupled external speaker(s) 118 through the media device 114.

Steps 220, 225, 230, 235, and 240 of the method 200 can continue until the audio stream is interrupted from the display device 102, regardless whether external voice is received.

In an embodiment related to method 200, when multiple voice-enabled speakers are connected and spatially dispersed around a room or multiple rooms, the media device 114 can adjust the playback to each speaker by applying an audio delay algorithm to the HDMI/ARC output that can synchronize the audio coming to each speaker. The algorithm, which is detailed in U.S. patent application Ser. No. 16/133,817, titled "Identifying Audio Characteristics of a Room Using a Spread Tone," U.S. patent application Ser. No. 16/133,813, titled "Wireless Audio Synchronization Using a Spread Code," and U.S. patent application Ser. No. 16/133,811 titled "Audio Synchronization of a Dumb Speaker and a Smart Speaker Using a Spread Code," uses knowledge of a specific speaker configuration to determine the delay to apply to the audio transmitted to each speaker, based on propagation delay over distance. Specifically, audio takes about one millisecond to travel about one foot.

In some embodiments using the audio delay algorithm, the media device 114 calculates a spread tone. Specifically, a tone from one external speaker 118 can be picked up by another external speaker 118. The media device 114 can take into account the delay between the two speakers to slightly delay the audio to one speaker for more accurate buffering and synchronized audio to the external speakers 118. In this way, the media device 114 can synchronize speaker devices, specifically to know when to transmit to each speaker device. It is desired to synchronize external speakers 118 to within at least ten (10) milliseconds, because a human will not typically notice a delay of less than ten (10) milliseconds. This delay calculation is different from any delay calculation applied to the audio due to network overloading.

Audio Content Recognition of Audio Received Over HDMI/ARC

Figure 3:
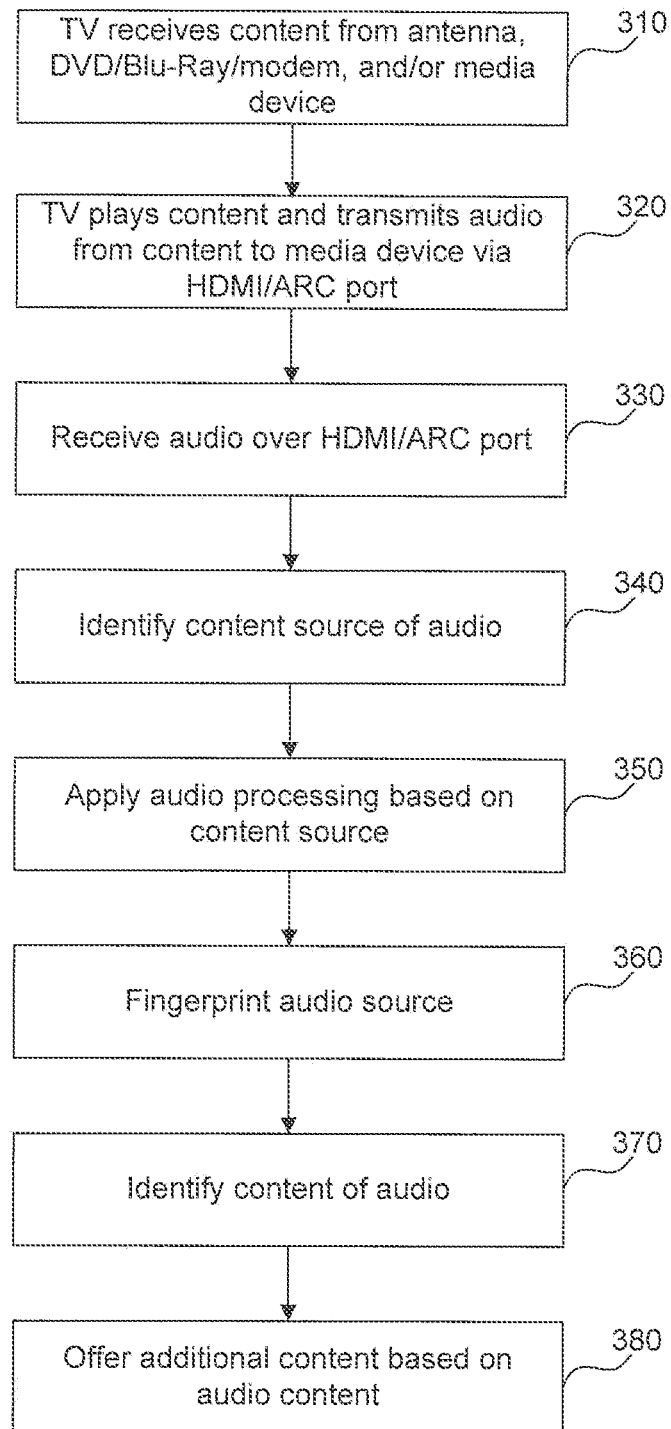
FIG. 3 illustrates a flow chart depicting a method of audio content recognition for audio received over HDMI/ARC, according to some embodiments.

FIG. 3 illustrates a flow chart depicting a method 300 of audio content recognition for audio received over HDMI/ARC, according to some embodiments. FIG. 3 is described in reference to the media streaming environment 100 of FIG. 1. For instance, a TV serves as the display device 102, for example, and is connected to the media device 114 by an HDMI/ARC port 106D on the TV. The media device 114 is also communicatively coupled to external speaker(s) 118.

In step 310, the TV/display device 102 can receive media content from the antenna 108, the DVD/Blu-ray/cable modem 112, and/or the media device 114, for example. In step 320, the TV/display device 102 can play the media content it receives and can transmit the audio from that content to the media device 114 over the HDMI/ARC port 106D. In step 330, the media device 114 can receive an audio stream from the TV/display device 102 over the HDMI/ARC port 106D.

In step 340, the media device 114 can identify the source of an audio stream based on the device to which the media device 114 is connected. Additionally or alternatively, the media device 114 can identify the content source of the audio stream using a source identifier and a channel identifier, predetermined and provided by a digital watermarking process previously performed by the content provider(s)/server(s) 134 prior to distribution, for example. The source identifier and/or channel identifier can be extracted from the audio stream by the media device 114 for this purpose.

"Watermarking" refers to inserting digital tags containing information about the audio content into the content itself prior to distribution. For example, a broadcast encoder may insert a watermark every few seconds that could be used to identify a broadcast channel with a channel identifier, a TV program with a source identifier, and a time stamp of the audio content. The source identifier and/or channel identifier, from such watermarking process, can be evaluated by the media device 114 to identify the specific TV program and/or broadcast channel, respectively, of the content.

Additionally, the time stamp of the audio content alternatively provided within the audio stream can assist the media device in determining content broadcast on a specific date and at a specific time, for example, a TV sitcom broadcast at 8:00 p.m. ET on a Wednesday night, Feb. 14, 2018.

In step 350, the media device 114 can apply audio processing based on the identified content source. For example, the media device 114 can select the processing algorithm to use based on whether the audio content is a broadcast TV program from the antenna 108 through the ANT port 106A of the TV/display device 102, a Netflix movie from the cable modem 112 through the HDMI port 106C of the TV/display device 102, or a YouTube video played into the USB port 106B of the TV/display device 102 from the computer 110, to name a few examples.

In step 360, the media device 114 can fingerprint the audio stream by using any applicable well known software algorithm to create a condensed digital summary from a short (for example, a few seconds) sample of the audio stream. This digital summary, or "signature," or "fingerprint" of the audio can then be used to identify the audio stream. The fingerprint may include attributes such as frequency, intensity, and relative time of signal points within the audio stream, which can form a spectrogram when plotted, for example.

The fingerprint can be saved locally in the media device 114 and can be used later (at another session of use, for example) by the media device 114 to inform the media device 114 about what types of content should initially be offered to the user at the start of the next session of use, for example. A plurality of fingerprints can be saved in the media device 114 indefinitely, subject to device memory limitations, for example. A user may clear the saved fingerprints using a control within the app 122 on the mobile device 120 or on the media device 114 itself. A unique list of fingerprints may be saved in the media device 114 for each unique user of the media device 114.

In step 370, to identify the audio stream using the fingerprint, the media device 114 can identify the content of the audio stream, such as the audio from a specific TV program ("Friends," for example), a movie ("Indiana Jones and the Raiders of the Lost Ark," for example), or a music video (Queen's and David Bowie's "Under Pressure," for example), by locating a matching fingerprint in the database of the content ID module 128, accessible over the Internet 124 connection. This fingerprinting process thus assists the media device 114 in audio content recognition, or identifying content, for example, based on the associated audio, while streaming.

In step 380, the media device 114 can use the fingerprint to determine what TV program a user is watching and offer similar or relevant content to the user, such as suggesting a like TV program or movie, for example, having a similar fingerprint within the database of the content ID module 128, or having the same or similar attributes, such as category, topic, content type, and/or genre, for example, as the identified TV program or movie. In addition to program and movie suggestions, the media device 114 may also offer the user advertising aimed at the user's preferences, such as what to buy, where to shop, what to eat, and where to dine, predicted based on pre-determined marketing data, for example. For example, the media device 114 may stream an advertisement for "Ted's Pizza Place," using a prediction from consumer marketing data that a person who enjoys watching "Friends" likes to eat pizza.

Figure 4:
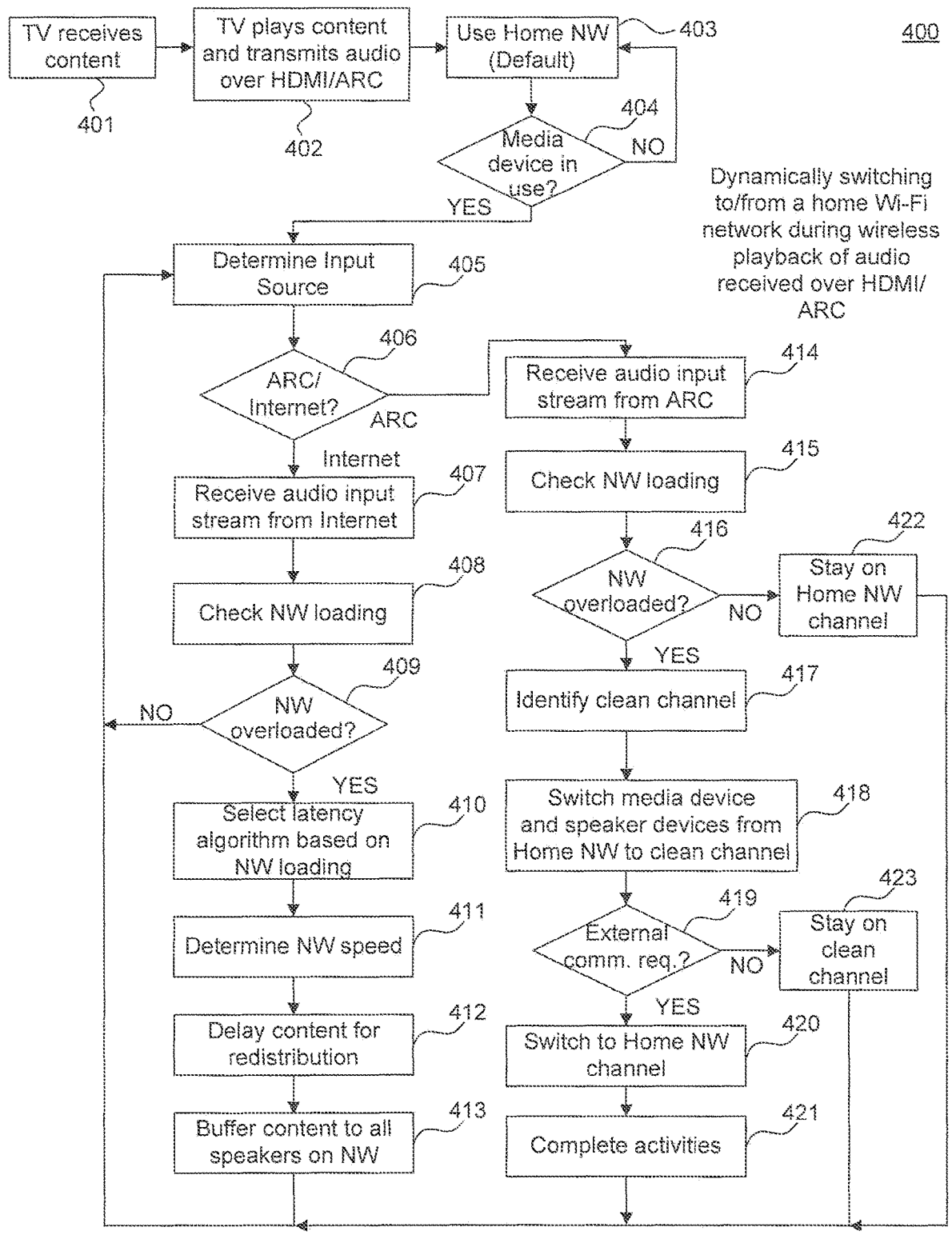
FIG. 4 illustrates a flow chart depicting a method of dynamically switching to/from a first network during wireless playback of audio received over HDMI/ARC, according to some embodiments.

Dynamically Switching to/from a First Network During Audio Playback Over HDMI/ARC FIG. 4 illustrates a flow chart depicting a method 400 of dynamically switching to/from a first network during wireless playback of audio received over HDMI/ARC, according to some embodiments. FIG. 4 is described in reference to the media streaming environment 100 of FIG. 1, wherein the media device 114 has a single transceiver 116, as in some embodiments. A TV serves as the display device 102, for example, and is connected to the media device 114 by an HDMI/ARC port 106D on the TV. The media device 114 is also communicatively coupled to external speaker(s) 118. A connection to the Internet 124 is available for communicatively coupling the media device 114 to one or more off-site administrative server(s) 126 and/or to one or more content provider(s)/server(s) 134.

In step 401, the TV/display device 102 can receive media content from the antenna 108, the DVD/Blu-ray/cable modem 112, and/or the media device 114, for example. In step 402, the TV/display device 102 can play the media content it receives and can transmit the audio from that content to the media device 114 over the HDMI/ARC port 106D. In step 403, the default, local Internet 124 connection, known as a "Home Network" (Home NW), is in use as a first wireless network, or the default network, on a default channel, for communicating media content.

In step 404, if the media device 114 is in use, the subsequent method 400 steps can be performed. In step 404, if the media device 114 is not in use, the Internet 124 connection can continue to communicate media content. Specifically, as used herein, the media device 114 is in use when the media device 114 is operational (connected, turned on, and initialized) and has as the input source the TV's HDMI/ARC port 106D. The media device 114 can then be communicatively coupled to the first wireless network as a default. Additionally, the media device 114 can make a communicative connection to the first wireless network upon a reset of the media device 114.

In method 400, the TV/display device 102 can receive media content over the HDMI port 106C from the cable modem 112, which is communicatively coupled to the Internet 124 on the Home NW, whether or not the media device 114 is operational and connected to the HDMI/ARC port 106D. The TV/display device 102 may not receive media content over the HDMI port 106C from the cable modem 112 in the case that there is a network disconnection or network overload condition, for example. A network disconnection may be due to a problem with the cable modem 112 preventing an Internet 124 signal from getting to the TV/display device 102, or a failure of a content provider/server 134, for example, an Internet service provider (ISP), to provide a signal into the home, for example.

If the media device 114 is in use, then in step 405, the media device 114 can determine the input source by evaluating whether an audio stream is coming from the HDMI/ARC port 106D of the TV/display device 102 or the Internet 124. In step 406, when the HDMI/ARC port 106D is the source, the media device 114 can receive the audio stream from the HDMI/ARC port 106D of the TV/display device 102, as shown in step 414. In step 414, the media device may identify and switch to another wireless network (or channel) as needed for uninterrupted audio streaming during a network overload condition of the Home NW, as described in the example below.

Returning to step 406, when the Internet 124 is the source of the audio stream, the media device 114 can receive the audio stream from content received over the Internet 124, as shown in step 407. In step 407, the media device 114 may not determine an alternate wireless network but can buffer content in the case of a network overload condition, as described in the example below. In steps 408 and 415, the media device 114 can check the network loading of the channel over which it is currently receiving an audio stream. The media device 114 can determine that the network loading of the wireless network that it is communicatively coupled to exceeds a predetermined threshold (or predetermined thresholds) of a maximum bandwidth and/or a maximum latency, for example.

Specifically, a network overload condition may be due to insufficient bandwidth on the Home NW to accommodate a number of Internet-connected devices within the home at the same time, for example. The amount of bandwidth usage sufficient to trigger a network overload condition may vary depending on the demand of the data being streamed and the capacity of the network. Higher quality content uses more bandwidth; for example, a 5 Mbps Internet download connection speed is recommended per stream to play a TV show or movie through Netflix. However, an ISP may apply a bandwidth or data cap to a home network's Internet service to prohibit streaming at such a connection speed.

A network overload condition may also be due to an unacceptable latency, that is, delay, between the time that data is transmitted from its source and received at its destination, which could prevent reliable and consistent streaming, for example. The amount of latency sufficient to trigger a network overload condition is similarly dependent on the demand of the data being streamed, but a latency on the order of tens of milliseconds (such as 30 ms, for example) may trigger a network overload condition.

In step 416, when the network is not overloaded, the media device 114 can remain on the Home NW or default channel, as shown in step 422. The media device 114 can continue to check for the input source (step 405) to determine whether it is still receiving an audio steam over the Internet or HMDI/ARC, and can continue to receive the audio stream as available from the input source (step 407 or 414). Although not shown in the flow chart of FIG. 4, while on the Home NW/default channel, the media device 114 can receive notifications and/or communications from the administrative server(s) 126 over the Internet 124, including information from the content ID module 128, and notification of the availability of software update(s) 130 and program update(s) 132.

Continuing the method where the HDMI/ARC port 106D is the source of the audio stream, in step 416, when the network is overloaded (indicates a network overload condition), the media device 114 can establish and/or identify a clean channel, such as an ad hoc network (step 417), and then can switch the media device 114, and any external speaker(s) 118 communicatively coupled to the media device 114, from the Home NW to the clean channel (step 418). When on the clean channel, the media device 114 may need to send or receive communications between itself and the administrative server(s) 126, as shown in step 419, to transfer information to/from the content ID module 128, or to receive software update(s) 130 and/or program update(s) 132. If so, the media device 114 can switch back to the Home NW channel (step 420) to complete administrative activities (step 421).

In step 423, as long as (1) the media device 114 is still streaming audio, (2) the user does not desire an interruption in the audio stream, (3) no administrative activities are necessary/mandatory to complete, or (4) there is no reset of the media device 114, the media device 114 can remain on the clean channel until the network is no longer overloaded. However, if a situation (such as one or more of the events (1)-(4) above) warrants a switch between network channels, the media device 114 can buffer some audio to mitigate any interruption in an ongoing audio stream. In some embodiments, switching by the media device 114 from a first wireless network to a second wireless network, or clean channel, is performed when needed to facilitate reliable audio streaming, while taking into account the potential for software updates and the assurance of sufficient audio quality. For example, switching too often may create data dropout that may not be mitigated by buffering.

In step 409, when the Home NW/default channel is not overloaded, the media device 114 can remain on the Home NW/default channel, and can continue to check for the input source (step 405) to determine whether it is still receiving an audio steam over the Internet or HDMI/ARC, and can continue to receive the audio stream as available from the input source (step 407 or 414). Although not shown in the flow chart of FIG. 4, while on the Home NW/default channel, the media device 114 can receive notifications and/or communications from the administrative server(s) 126 over the Internet 124, including information from the content ID module 128, and notifications of the availability of software update(s) 130 and/or program update(s) 132.

Continuing the method where the Internet 124 is the source of the audio stream, in step 409, when the Home NW/default channel is overloaded (indicates a network overload condition), the media device 114 can then select a latency algorithm based on the network loading (step 410) and can determine the existing network speed (step 411). In step 412, with a selected latency algorithm and the known network speed, the media device 114 can delay content for redistribution rather than continue to try to stream the audio as it comes from the source (for example, the TV/display device 102 streaming a TV program over the HDMI/ARC port 106D).

In step 413, the media device 114 can buffer the content to the external speaker(s) 118 on the network so that the audio stream can continue uninterrupted and play back seamlessly to the user. The media device 114 can also synchronize the delayed audio with the corresponding video from the TV/display device 102. The media device 114 can continue this buffering and delayed redistribution of the audio stream to the communicatively-coupled external speaker(s) 118 as long as the network overload condition continues. If a network is overloaded such that a clean audio stream cannot be achieved by buffering and delayed redistribution, the media device 114 can provide a notification to the user of the network overload condition, such as over the TV/display device 102 and/or on the app 122 of the mobile device 120, for example.

In an embodiment related to method 400, when multiple voice-enabled speakers are connected and spatially dispersed around a room or multiple rooms, the media device 114 can adjust the playback to each speaker by applying an audio delay algorithm to the HDMI/ARC audio stream that can synchronize the audio transmitted to each speaker. The algorithm, which is detailed in U.S. patent application Ser. No. 16/133,817, titled "Identifying Audio Characteristics of a Room Using a Spread Tone," U.S. patent application Ser. No. 16/133,813, titled "Wireless Audio Synchronization Using a Spread Code," and U.S. patent application Ser. No. 16/133,811 titled "Audio Synchronization of a Dumb Speaker and a Smart Speaker Using a Spread Code," uses knowledge of a specific speaker configuration to determine the delay to apply to the audio transmitted to each speaker, based on propagation delay over distance. Specifically, audio takes about one millisecond to travel about one foot.

In some embodiments using the audio delay algorithm, the media device 114 calculates a spread tone. Specifically, a tone from one external speaker 118 can be picked up by another external speaker 118. The media device 114 can take into account the delay between the two speakers to slightly delay the audio to one speaker for more accurate buffering and synchronized audio to the external speakers 118. In this way, the media device 114 can synchronize speaker devices, specifically to know when to transmit to each speaker device. It is desired to synchronize external speakers 118 to within at least ten (10) milliseconds, because a human will not typically notice a delay of less than ten (10) milliseconds. This delay calculation is different from any delay calculation applied to the audio due to network overloading.

Computer System Implementation

Figure 5:
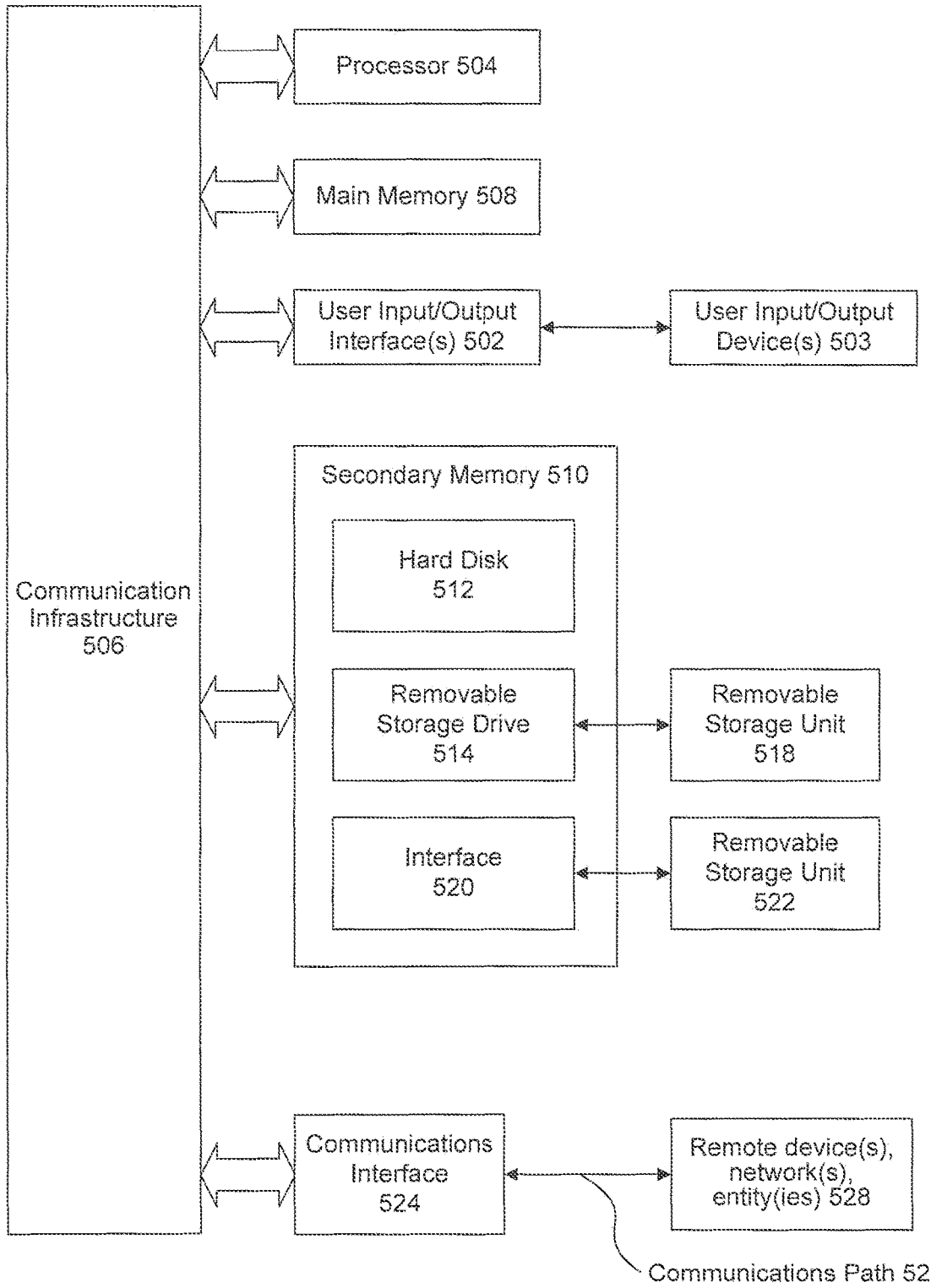
FIG. 5 illustrates an example computer system, according to some embodiments.

FIG. 5 illustrates an example computer system 500. Various embodiments can be implemented, for example, using one or more well-known computer systems, such as computer system 500. One or more computer systems 500 can be used, for example, to implement any of the embodiments discussed herein, as well as combinations and subcombinations thereof.

Computer system 500 can include one or more processors (also called central processing units, or CPUs), such as a processor 504. Processor 504 can be connected to a communication infrastructure (or bus) 506.

Computer system 500 can also include user input/output device(s) 503, such as monitors, keyboards, pointing devices, etc., which can communicate with communication infrastructure 506 through user input/output interface(s) 502.

One or more of processors 504 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 can also include a main or primary memory 508, such as random access memory (RAM). Main memory 508 can include one or more levels of cache. Main memory 508 can have stored therein control logic (for example, computer software) and/or data.

Computer system 500 can also include one or more secondary memory (or storage devices) 510. Secondary memory 510 can include, for example, a hard disk drive 512 or a removable storage drive (or device) 514. Removable storage drive 514 can be a floppy disk drive, a magnetic tape drive, a compact disk drive, an optical storage device, a tape backup device, or any other storage device/drive, for example.

Removable storage drive 514 can interact with a removable storage unit 518. Removable storage unit 518 can include a computer usable or readable storage device having stored thereon computer software (control logic) or data. Removable storage unit 518 can be a floppy disk, magnetic tape, a compact disk, a DVD, an optical storage disk, or any other computer data storage device, for example. Removable storage drive 514 can read from or write to removable storage unit 518.

Secondary memory 510 can include other means, devices, components, instrumentalities, or other approaches for allowing computer programs or other instructions or data to be accessed by computer system 500. Such means, devices, components, instrumentalities, or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 500 can further include a communications (or network) interface 524. Communications interface 524 can enable computer system 500 to communicate and interact with any combination of external devices, external networks, external entities, etc. (individually and collectively referenced by reference number 528). For example, communications interface 524 can allow computer system 500 to communicate with external or remote device(s), network(s), entity(ies) 528 over communications path 526, which can be wired or wireless (or a combination thereof), and which can include any combination of LANs, WANs, the Internet, etc. Control logic or data can be transmitted to and from computer system 500 via communications path 526.

Computer system 500 can also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 500 can be a client or server, accessing or hosting any applications or data through any delivery paradigm, including but not limited to remote or distributed cloud computing solutions; local or on-premises software ("on-premise" cloud-based solutions); "as a service" models (for example, content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 500 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas can be used, either exclusively or in combination with known or open standards.

In some embodiments, a tangible, non-transitory apparatus or article of manufacture comprising a tangible, non-transitory computer useable or readable medium having control logic (software) stored thereon can also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), can cause such data processing devices to operate as described herein.

Based on the teachings contained in this disclosure, it will be apparent to persons skilled in the relevant art how to make and use embodiments of this disclosure using data processing devices, computer systems, or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method in a media device communicatively coupled to a High-Definition Multimedia Interface (HDMI)/Audio Return Channel (ARC) interface of a display device, comprising:

receiving an audio stream from the display device over the HDMI/ARC interface, wherein the audio stream is generated by the display device;
processing the audio stream received from the display device over the HDMI/ARC interface, wherein the processing comprises:
identifying the audio stream received from the display device over the HDMI/ARC interface;
decoding the audio stream into multi-channel audio, thereby determining a known audio in the audio stream;
encoding the multi-channel audio to a streaming format compatible with an external voice-enabled smart speaker; and
transmitting the encoded multi-channel audio to the external voice-enabled smart speaker;
receiving voice from the external voice-enabled smart speaker, wherein the received voice represents an input from a microphone at the external voice-enabled smart speaker that is communicatively coupled to the media device;
cancelling the known audio from the audio stream, thereby generating an isolated voice;
determining the isolated voice is a voice command for the external voice-enabled smart speaker; and
causing the external voice-enabled smart speaker to perform an action based on the voice command.

2. The method of claim 1, wherein the display device is a non-smart television.

3. The method of claim 1, wherein the processing of the audio stream further comprises:
selecting an audio processing algorithm from a plurality of audio processing algorithms based on an audio compression format of the audio stream; and
wherein the decoding the audio stream further comprises processing the audio stream using the selected audio processing algorithm.

4. The method of claim 1, further comprising:
transmitting the encoded multi-channel audio to an additional external speaker, wherein the additional external speaker is communicatively coupled to the media device and is separate from the external voice-enabled smart speaker.

5. The method of claim 1, wherein the received voice is a far-field voice.

6. The method of claim 1, further comprising:
buffering additional encoded multi-channel audio while the external voice-enabled smart speaker performs the action based on the voice command.

7. The method of claim 6, further comprising:
transmitting the buffered additional encoded multi-channel audio to the external voice-enabled smart speaker after the external voice-enabled smart speaker performs the action based on the voice command.

8. A media device, comprising:
a transceiver;
a memory; and
a digital signal processor coupled to the memory and configured to:
receive an audio stream from a display device coupled to the media device by a High-Definition Multimedia Interface (HDMI)/Audio Return Channel (ARC) interface, wherein the audio stream is generated by the display device;
process the audio stream received from the display device over the HDMI/ARC interface, wherein the digital signal processor is configured to:
identify the audio stream received from the display device over the HDMI/ARC interface;
decode the audio stream into multi-channel audio, thereby determining a known audio in the audio stream;
encode the multi-channel audio to a streaming format compatible with the media device and an external voice-enabled smart speaker; and
transmit the encoded multi-channel audio to the external voice-enabled smart speaker via the transceiver;
receive voice from the external voice-enabled smart speaker, wherein the received voice represents an input from a microphone at the external voice-enabled smart speaker that is communicatively coupled to the media device;
cancel the known audio from the audio stream, thereby generating an isolated voice;
determine the isolated voice is a voice command for the external voice-enabled smart speaker; and
cause the external voice-enabled smart speaker to perform an action based on the voice command.

9. The media device of claim 8, wherein the digital signal processor is further configured to:
select an audio processing algorithm from a plurality of audio processing algorithms based on an audio compression format of the audio stream; and
wherein to decode the audio stream, the digital signal processor is further configured to process the audio stream using the selected audio processing algorithm.

10. The media device of claim 8, wherein the digital signal processor is further configured to:
transmit the encoded multi-channel audio to an additional external speaker, wherein the additional external speaker is communicatively coupled to the media device and is separate from the external voice-enabled smart speaker.

11. The media device of claim 8, wherein the received voice is a far-field voice.

12. The media device of claim 8, wherein the digital signal processor is further configured to:
buffer additional encoded multi-channel audio while the external voice-enabled smart speaker performs the action based on the voice command.

13. The media device of claim 12, wherein the digital signal processor is further configured to:
transmit the buffered additional encoded multi-channel audio to the external voice-enabled smart speaker after the external voice-enabled smart speaker performs the action based on the voice command.

14. A non-transitory computer readable medium having instructions stored thereon that, when executed by at least one computing device, cause the at least one computing device to perform operations comprising:
receiving an audio stream from a display device over a High-Definition Multimedia Interface (HDMI)/Audio Return Channel (ARC) interface, wherein the audio stream is generated by the display device;
processing the audio stream received from the display device over the HDMI/ARC interface, wherein the processing comprises:
identifying the audio stream received from the display device over the HDMI/ARC interface;
decoding the audio stream into multi-channel audio, thereby determining a known audio in the audio stream;

encoding the multi-channel audio to a streaming format compatible with an external voice-enabled smart speaker; and transmitting the encoded multi-channel audio to the external voice-enabled smart speaker;

receiving voice from the external voice-enabled smart speaker, wherein the received voice represents an input from a microphone at the external voice-enabled smart speaker that is communicatively coupled to the media device;

cancelling the known audio from the audio stream, thereby generating an isolated voice;

determining the isolated voice is a voice command for the external voice-enabled smart speaker; and causing the external voice-enabled smart speaker to perform an action based on the voice command.

15. The non-transitory computer readable medium of claim 14, wherein the display device is a non-smart television.

16. The non-transitory computer readable medium of claim 14, wherein the processing of the audio stream further comprises:

selecting an audio processing algorithm from a plurality of audio processing algorithms based on an audio compression format of the audio stream; and wherein the decoding the audio stream further comprises processing the audio stream using the selected audio processing algorithm.

17. The non-transitory computer readable medium of claim 14, wherein the operations further comprise:

transmitting the encoded multi-channel audio to an additional external speaker, wherein the additional external speaker is communicatively coupled to the media device and is separate from the external voice-enabled smart speaker.

18. The non-transitory computer readable medium of claim 14, wherein the received voice is a far-field voice.

19. The non-transitory computer readable medium of claim 14, wherein the operations further comprise:

buffering additional encoded multi-channel audio while the external voice-enabled smart speaker performs the action based on the voice command.

20. The non-transitory computer readable medium of claim 19, wherein the operations further comprise:

transmitting the buffered additional encoded multi-channel audio to the external voice-enabled smart speaker after the external voice-enabled smart speaker performs the action based on the voice command.

* * * * *